(12) United States Patent
Heutschi et al.

(10) Patent No.: US 6,692,363 B1
(45) Date of Patent: Feb. 17, 2004

(54) DOUBLE JOINT FOR STEERING AXLES IN AUTOMOBILES

(75) Inventors: Gerhard Heutschi, Schaan (LI); Christian Lutz, Nüziders (AT)

(73) Assignee: Krupp Presta AG, Eschen (LI)

( * ) Notice: Subject to any disclaimer, the term of this patent is extended or adjusted under 35 U.S.C. 154(b) by 0 days.

(21) Appl. No.: 09/600,556

(22) PCT Filed: Jan. 13, 1999

(86) PCT No.: PCT/CH99/00012

§ 371 (c)(1), (2), (4) Date: Oct. 3, 2000

(87) PCT Pub. No.: WO99/36707

PCT Pub. Date: Jul. 22, 1999

(30) Foreign Application Priority Data

Jan. 19, 1998 (CH) ............................................... 107/98

(51) Int. Cl.[7] ................................................ F16D 3/40
(52) U.S. Cl. ........................................ 464/118; 403/132
(58) Field of Search ................................ 464/115, 116, 464/117, 118, 905; 403/132, 133; 74/492

(56) References Cited

U.S. PATENT DOCUMENTS

| 1,933,464 | A | * | 10/1933 | Chilton | 464/116 |
|---|---|---|---|---|---|
| 2,329,903 | A | * | 9/1943 | Horne | 464/116 |
| 2,986,022 | A | * | 5/1961 | Stokely | 464/118 |
| 3,029,618 | A | * | 4/1962 | Bouchard et al. | 464/118 |
| 3,041,094 | A | * | 6/1962 | Herbenar | 403/133 X |
| 3,906,747 | A | * | 9/1975 | Orain | 464/116 X |
| 4,207,757 | A | * | 6/1980 | Onuma | 464/118 X |
| 4,273,209 | A | * | 6/1981 | Orain | 464/115 X |
| 5,376,723 | A |   | 12/1994 | Vogt et al. |   |
| 5,820,467 | A | * | 10/1998 | Fevre et al. | 464/118 |
| 5,865,558 | A | * | 2/1999 | Cebollero | 403/133 |
| 6,302,615 | B1 | * | 10/2001 | Kleiner et al. | 403/133 X |
| 6,413,003 | B1 | * | 7/2002 | Schmidt et al. | 403/133 X |

FOREIGN PATENT DOCUMENTS

| EP | 0 560 058 | 9/1993 |
|---|---|---|
| FR | 2 730 774 | 8/1996 |
| GB | 913 365 | 12/1962 |
| GB | 2 017 256 | 10/1979 |
| WO | WO 95/12073 | 5/1995 |

* cited by examiner

Primary Examiner—Greg Binda
(74) Attorney, Agent, or Firm—Crowell & Moring LLP

(57) ABSTRACT

A steering shaft double joint is provided for motor vehicles where the shaft ends are connected non-rotatably in the joint. Each of the shaft ends is movably mounted in a housing connecting two joints with the shaft ends being connected by a ball joint so that the ball is rotatable around a midpoint in a receptacle of a shaft end and is slightly movably mounted in a direction of the shaft axis of the other shaft end. The ball is spring mounted in the receptacle and the receptacle contains and surrounds a bushing with elastic material located between the receptacle and bushing.

23 Claims, 4 Drawing Sheets

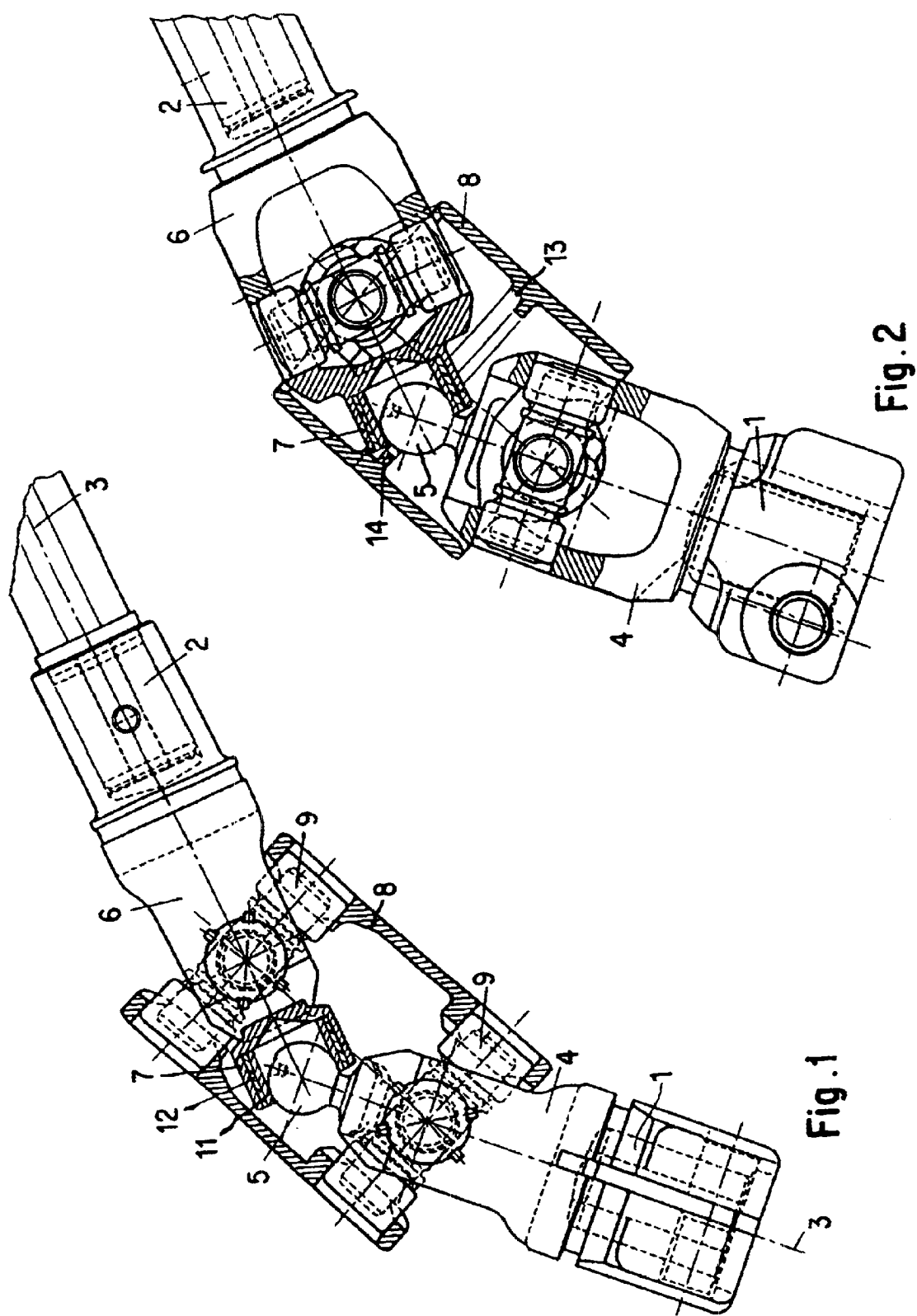

DOUBLE JOINT FOR STEERING AXLES IN AUTOMOBILES

BACKGROUND AND SUMMARY OF THE INVENTION

The invention relates to a steering shaft double joint for motor vehicles with shaft ends each connected nonrotatably in a joint, each of these ends being in a joint and being movably mounted in a housing connecting the two joints; the two shaft ends being connected with one another between the two joints by a ball joint so that the ball is rotatable around its midpoint in a receptacle of the other shaft end and is slidably movably mounted in the direction of the shaft axis of the other shaft end.

A known double-jointed arrangement for example is the double articulated joint with a ball joint located between the two joint crosses. In these known arrangements of double universal joints, two joint crosses are connected movably by one articulated joint axis with one fork at each of the two shaft ends and by the other joint axis movably to a connecting housing. The middle centering is produced by an articulated connection of the two shaft ends within the connecting housing with a metallic joint ball at one shaft end and a cylindrical, likewise metallic, receptacle at the other shaft end in which the joint ball engages. The connecting housing forms a cavity in the interior that creates a space for the movement of the centering jointed connection and is adjusted in size to the maximum angular deflection of the two shaft ends relative to the stretched axis. The ends or pins of the two joint crosses are mounted suitably for easy accessibility, for example with roller bearings which are located in bores of the fork arms or in the connecting housing. The universal joint mounting with its eight bearing points as well as the central ball bearing require high precision in order to ensure ease of movement of the double universal joint. A slight displacement of the two shaft axes within the tilting plane for example can result in jamming in certain positions which can adversely affect ease of movement considerably. In addition, this also leads to undesired wear phenomena. In order to limit such disadvantages, the bearings must be made suitably precisely which causes high expense in manufacturing. Another known way to reduce the problem consists in providing rubber-elastic material as an insert for the pins of the universal joints so that the bearing can adjust itself through the spring mobility obtained in this fashion relative to manufacturing tolerances and simultaneously can have a vibration-damping effect. A rubber-elastic bearing with two to all eight universal joint pins is limiting if small sizes are required and is expensive and delicate to manufacture.

The goal of the present invention is to propose an steering shaft double joint in which the disadvantages of the prior art are eliminated. In particular, the goal consists in making a double joint which, in addition to ease of mobility, can be installed simply and economically and is insensitive to manufacturing tolerances.

This goal is achieved according to the invention as described below.

This goal is achieved according to the invention by an arrangement of the above-noted type having at least one of the following features:

(i) the ball is spring mounted in the receptacle; and
(ii) stop structure for the ball and receptacle are provided on the inside wall of the housing.

According to the invention, the receptacle for the ball which connects the two ends of the shaft movably is made spring-like or elastic. This permits a very inexpensive design since the compensation of tolerances by the sprung bearing is required only once.

The ball on one shaft end is preferably mounted, more preferably rotatably disposed, in the receptacle of the other shaft end so that the receptacle for the ball is designed as a sliding bushing and this sliding bushing surrounds the ball cylindrically. The bushing in turn is elastically mounted, with an elastic material placed between the bushing and the receptacle, advantageously a rubber-elastic material with a shore hardness in the range of 30 to 80 shore. Good elastic movements of the bushing are produced by the fact that the shore hardness is chosen in the range from 30 to 60 shore.

The elastic material between the receptacle at the end of the shaft, which is pot-shaped for example, and the sliding bushing which advantageously has a circularly round cross section can be shaped to produce favorable elastic deflection. Preferably, the outside wall of the cylindrical part is made wavy.

The sliding bushing in which the ball slides and turns is made of a sliding bearing material, with such a bushing also having a sliding coating. However, bushings with a sintered metal with a supporting sleeve are especially suitable.

The bushing itself should be made so that it together with the ball produces a zero-play bearing. This is produced by the fact that the sliding bushing abuts the ball in a spring-elastic fashion with a certain amount of pretensioning and therefore with zero play. Slitting the outside wall of the sliding bushing enables the sliding bushing to breathe in the radial direction. In this way, both radial tolerances in the diameter of the ball for example can be adjusted for and differences in tolerance of the shaft axes can be compensated by the elastic mounting of the bushing. In addition, the wear rates are compensated by the elastic adjustment.

Another advantageous embodiment consists in the fact that the plastic guide is mounted on the joint ball, so that the plastic guide slides in the sliding bushing or the cylindrical receptacle itself. In this case, it is even possible to make the bushing or the receptacle without special bearing material. The bearing bushing can even be eliminated and the plastic part that adheres to the ball can then slide directly guided in the receiving sleeve. A spring-mounted bushing can then be eliminated.

In double universal joint arrangements, especially of the type mentioned earlier, it is also important that when the joint is assembled a guide is provided which brings the ball joint together in the intended way and also that in extreme end positions of the joint which do not meet normal operating conditions, a specific stop is provided for safety reasons. By appropriately designing the connecting housing in the inner area with corresponding rotating stop surfaces, this can be defined. It is important to note that in particular this receptacle that holds the spring-elastically mounted bushing in the extreme position initially abuts the stop and then the joint ball on a second contact surface. In this way, especially in a non-installed state, assurance is provided that the stop is damped in the extreme position. This type of stop definition is especially suited for this kind of spring-elastic ball joint bearing according to the invention, but can also be used in other double universal joints without spring-elastic ball joint mounting.

For double jointed arrangements, other designs are suitable as cross joints, if for example especially high ease of movement and uniform movement are required, the double joints are preferably made with a universal joint, also called a homokinetic joint, especially of the synchro-fixed joint design. Between the two joints connected with a housing, the ball joint with the spring-elastic bearing is again located so that the shaft ends are held by the two joints so that they bend. Synchro-fixed bearings are made for example as L öbro joints by the company Löhr & Bromkamp GmbH, DE 6050 Offenbach.

The invention will now be described in greater detail with reference to embodiments with schematic figures.

BRIEF DESCRIPTION OF THE DRAWINGS

FIG. 1 shows schematically and in section a design for a steering shaft double universal joint according to the invention;

FIG. 2 shows schematically and in section another design according to the invention of a steering shaft double articulated joint offset by 90° and with stop means for limiting the deflection;

FIG. 3b is a side view of the bushing with elastic material according to FIG. 3a;

DETAILED DESCRIPTION OF THE DRAWINGS

Figure 7:
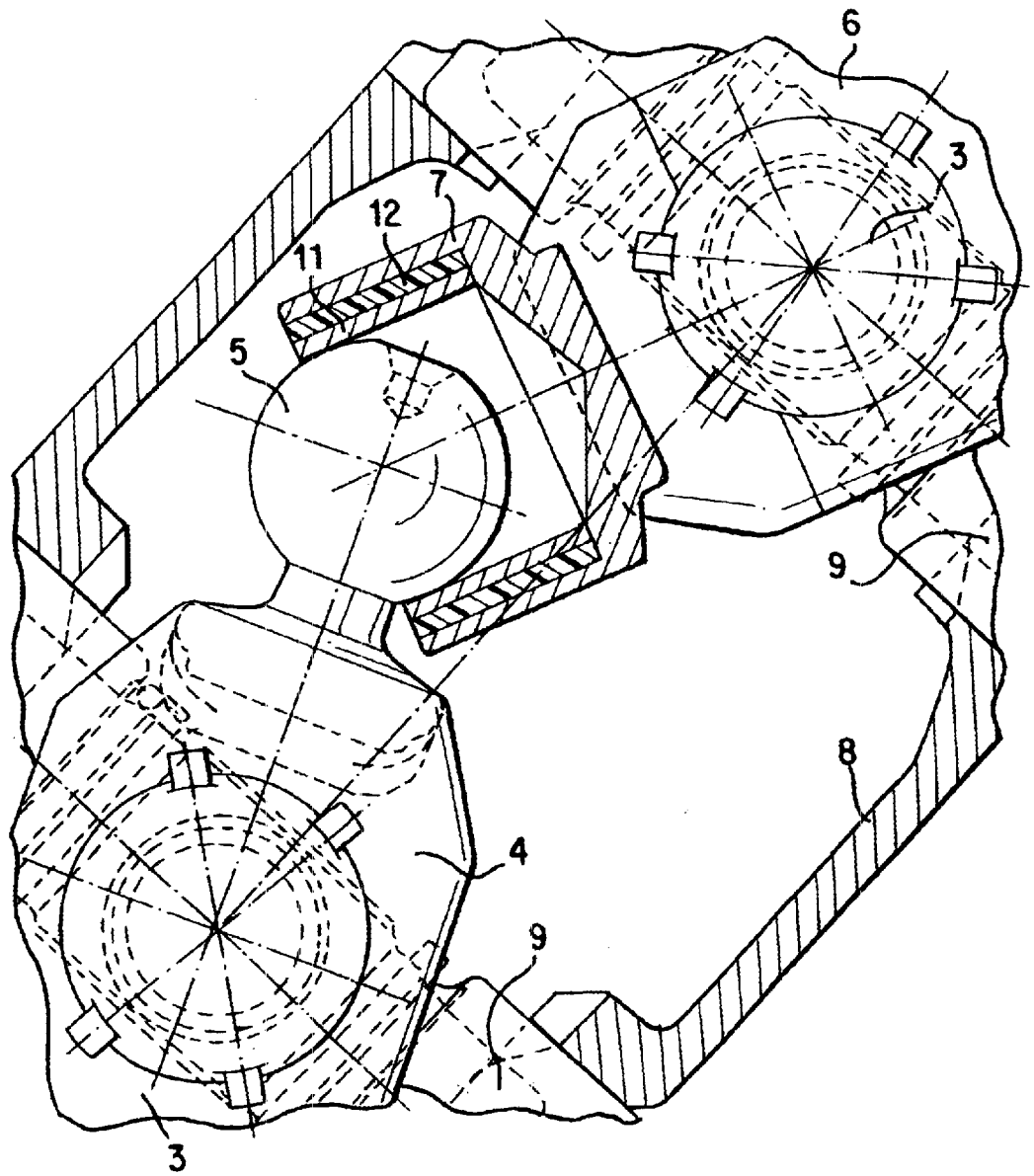
FIG. 7 shows the assembled ball joint of FIGS. 1 and 2 in greater detail.

In FIGS. 1, 2 and 7, a steering shaft double universal joint according to the invention is shown in cross section. The joint includes a connecting housing 8 respectively a tube double fork, in which two joint crosses 9 movably mounted are located. The shaft ends 1 and 2 with the axes 3 are connected by forks 4 and 6 mounted on joint crosses 9, and connected in an articulated manner by ball 5 with receptacle 7. Alternatively, the double universal joint may include one or two homokinetic joints in place of the joints using joint crosses.

Receptacle 7 is made in the shape of a sliding bushing or receives a cylindrical sliding bushing 11 which is either coated with a sliding material, for example a sliding metal, or consists of a sliding material such as a sintered metal with a supporting sleeve 10, for example. In order to permit suitable matching of tolerances, this bushing 11 is mounted spring-elastically in receptacle 7. The spring-elastic mounting of the bushing 11 in the receptacle is produced for example by the fact that between sliding bushing 11 and receptacle 7 a spring-elastic material 12 is provided, preferably a rubber-elastic material. The rubber-elastic material, in order to determine the spring travel further, can also be profiled, for example it can be corrugated. The material preferably consists of elastomers with a shore hardness in the range from 30 to 80 shore, with especially good results being obtained in a range from 30 to 60 shore.

FIG. 2 shows a joint rotated through 90° in cross section, in which joint forks 4 and 6 on shaft ends 2 and 3 are shown. These shaft ends are mounted movably as mentioned in cross joints 9 on housing 8 which can be made tubular for example. In the central inner area of housing 8, the end stops 13 and 14 are shown made as annular elevations and being useful until the joint is assembled and simultaneously serving as safety stops in extreme end positions of the joint. The stop surfaces 13 and 14 are designed so that receptacle 7 in the extreme position opposite ball 5 first contacts stop 13 in a motion-limiting fashion.

Figure 3B:
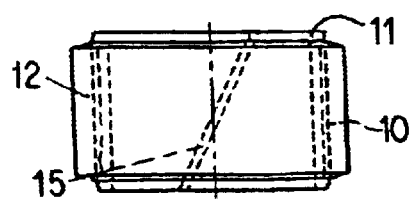
Figure 3A:
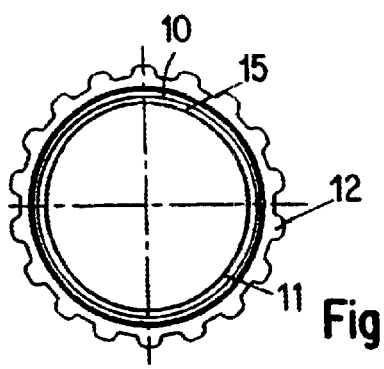
FIG. 3a shows a top view of a bearing bushing with shaft-shaped rubber-elastic material.

Sliding bushing 11, which is shown in FIG. 3a in a top view and in FIG. 3b in a side view, is preferably interrupted on its lengthwise axis by a slot 15 so that the bushing can breathe radially and can be fitted pretensioned onto the ball. As a result, the bushing turns and/or slides with zero play on ball 5. Slot 15 can be made lengthwise or spiral-shaped or in another way that interrupts the wall. The elastomer 12 has wave-shaped arrangement as shown in FIG. 3a, which recess permits an additional degree of freedom in the dimensioning of the elastic deflection. Other forms, strip shaped for example, are also possible.

Figure 4:
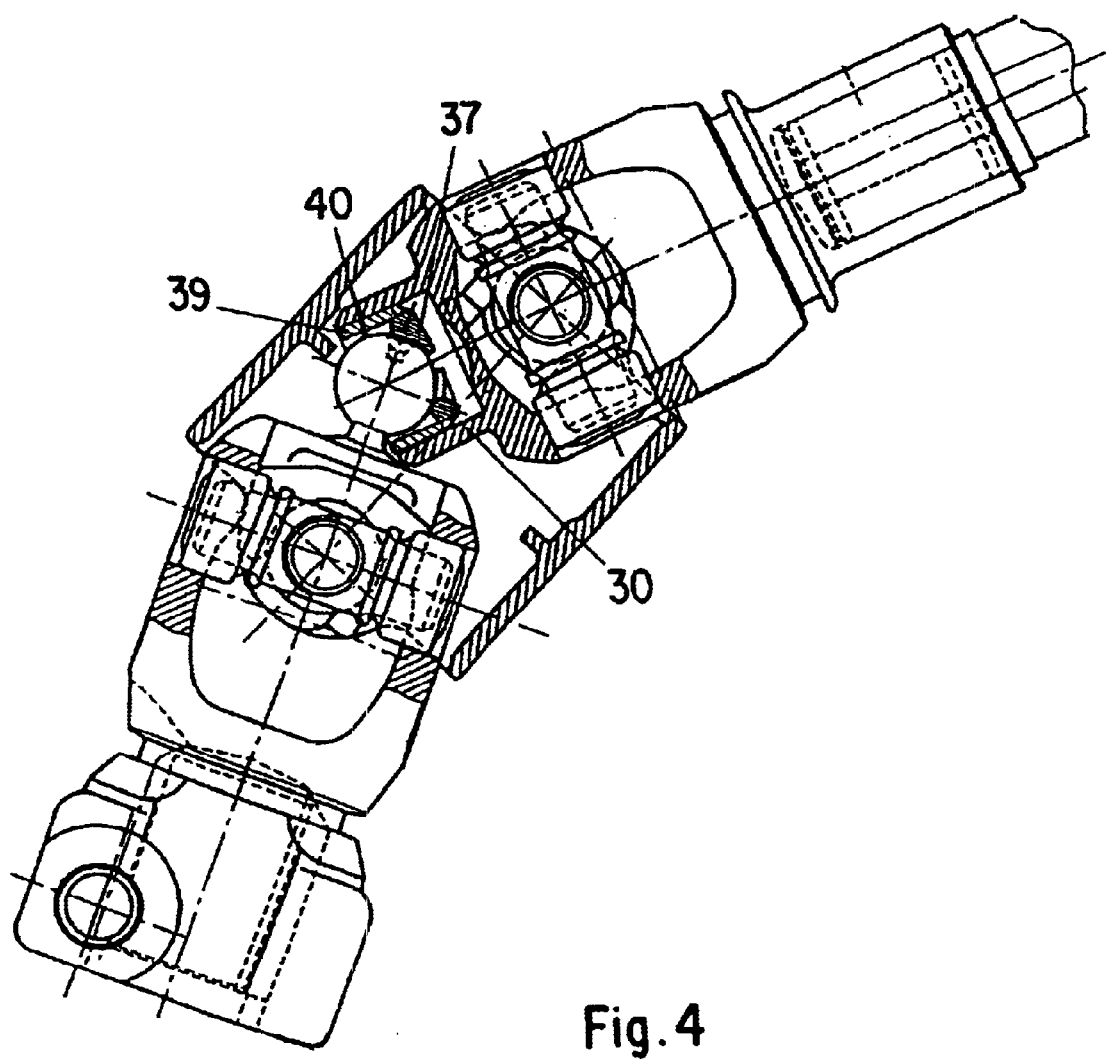
FIG. 4 shows schematically and in section a version of a design according to the invention for a steering shaft double articulated joint with a plastic sliding guide.

The version in FIG. 4 shows in cross section another preferred possibility for compensating the play. The plastic sliding bearing 37 shown in FIG. 4, disposed in a sliding bushing 30, is provided in its outside wall area with a plastic spring 39 which permits sliding with zero play. Spring 39 is preferably made in one piece with plastic guide 37, with the spring 39 preferably has slots 40 so that it can breathe radially and abuts the inside surface of the wobbling guide to compensate for tolerance.

Figure 5B:
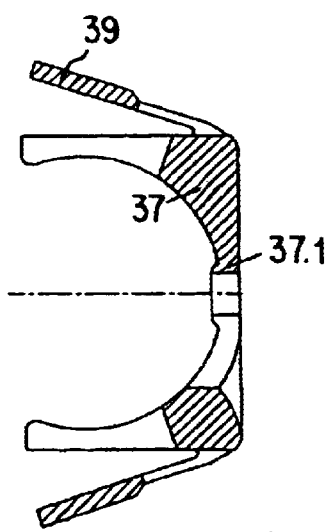
FIG. 5b shows schematically and in lengthwise section a plastic sliding guide in an installed state.
Figure 5A:
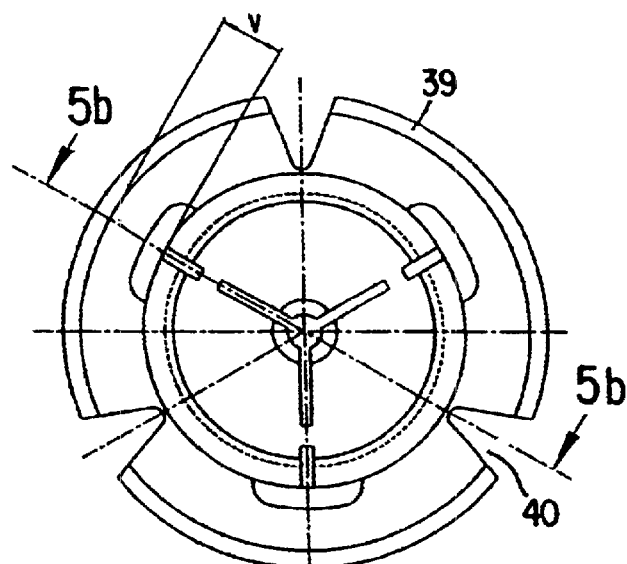
FIG. 5a shows schematically and in cross section a plastic sliding guide in the non-installed state.
Figure 6B:
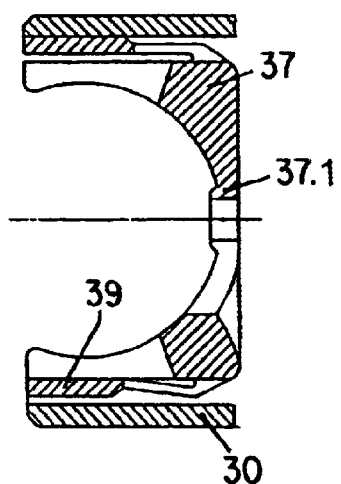
FIG. 6b shows schematically and in lengthwise section a plastic sliding guide in the installed state.
Figure 6A:
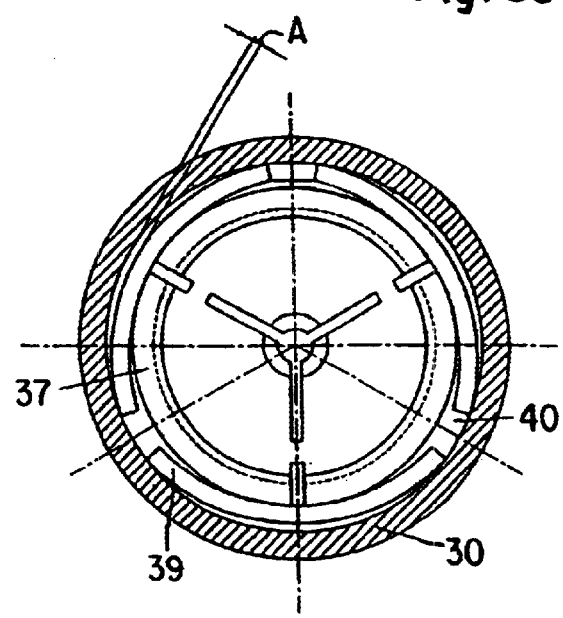
FIG. 6a shows schematically and in cross section a plastic sliding guide in the installed state.

The plastic sliding guide 37 is shown in detail in FIGS. 5a and 5b in the non-installed state. FIG. 5a shows guide 37 in cross section with springs 39 spread, which take care of compensating tolerances for pretensioning V by their spring action. Guide 37 can be designed for additional spring-elastic locking to the joint ball in the center with additional spring lips 37.1. The surrounding spring 39 is slotted in portions of the circumference so that it can breathe in a spring-movable fashion in the radial direction. In a lengthwise section according to FIG. 5b, the spread plastic spring 39 is shown. In FIGS. 6a and 6b, the same sliding guide 37 with spring 39 is shown in transverse and lengthwise sections. Spring 39 rests on receptacle 7, 30 designed as a bushing and split A is bridged compensating the tolerance. In this design, an elastically mounted sliding bushing 11 can be eliminated and the plastic sliding guide 37 slides directly in the receptacle made in the form of a cylindrical bushing.

The various features of novelty which characterize the invention are pointed out with particularity in the claims annexed to and forming a part of this disclosure and are entirely based on the priority Swiss application.

What is claimed is:

1. A steering shaft double joint comprising:
   two shaft ends;
   two joints, each shaft end being connected nonrotatably to one of the joints;
   a housing, the two joints being disposed in the housing;
   a ball joint arranged between the two joints, the ball joint including:
   a ball connected to one of the shaft joints,
   a receptacle connected to the other shaft joint, wherein the ball is rotatably disposed in the receptacle and is axially slidable relative to the shaft end to which the receptacle is connected,
   a bushing disposed between the ball and the receptacle, and
   an elastic element disposed radially between the receptacle and bushing, the elastic element allowing the ball to be elastically moveable in the receptacle in a direction lateral to the shaft end to which the ball is connected, wherein the elastic element is made from an elastomer.

2. The joint according to claim 1, wherein the bushing comprises a sintered metal having a supporting sleeve.

3. The joint according to claim 2 wherein the bushing surrounds the ball to compensate for wear and tolerances and with zero play.

4. The joint according to claim 1, wherein the bushing is slotted such that the bushing can expand and contract radially and can be fitted onto the ball with pretension.

5. The joint according to claim 1, wherein the double joint includes a homokinetic joint that has at least one of a synchro-fixed joint and a cross joint.

6. The joint according to claim 1, further comprising a stop structure on an inside wall of the housing for limiting the motion of the ball and the receptacle.

7. The joint according to claim 1 further comprising stop means for limiting the motion of the ball and the receptacle, the stop means being disposed on an inside wall of the housing.

8. The joint according to claim 7, wherein the stop means are designed so that the ball and the receptacle in all joint extreme deflections and in the event of installation define the specific permissible positions.

9. The joint according to claim 8, wherein the stop means is designed such that in a stop, the receptacle contacts first the stop means and then the ball.

10. The joint according to claim 1, wherein the bushing comprises a sliding coating.

11. A steering shaft double joint comprising:

two shaft ends;

two joints, each shaft end being connected nonrotatably to one of the joints;

a housing, the two joints being disposed in the housing;

a ball joint arranged between the two joints, the ball joint including:
    a ball connected to one of the shaft joints,
    a receptacle connected to the other shaft joint, wherein the ball is rotatably disposed in the receptacle and is axially slidable relative to the shaft end to which the receptacle is connected,
    a bushing disposed between the ball and the receptacle, and
    an elastic element disposed radially between the receptacle and bushing, the elastic element having inner and outer wall areas and allowing the ball to be elastically moveable in the receptacle in a direction lateral to the shaft end to which the ball is connected, wherein the elastic element is corrugated on at least one of the inner and outer wall areas.

12. The joint according to claim 11, wherein the elastic element is made from an elastomer having a Shore hardness in the range from 30 to 80.

13. The joint according to claim 12, wherein the Shore hardness is in the range from 30 to 60.

14. The joint according to claim 11, wherein the bushing comprises a sintered metal having a supporting sleeve.

15. The joint according to claim 14, wherein the bushing is slotted such that the bushing can expand and contract radially and can be fitted onto the ball with pretension.

16. The joint according to claim 11, wherein the bushing surrounds the ball with zero play to compensate for wear and tolerances.

17. The joint according to claim 11, wherein the bushing comprises a sliding coating.

18. A steering shaft double joint comprising:

two shaft ends;

two joints, each shaft end being connected nonrotatably to one of the joints;

a housing, the two joints being disposed in the housing;

a ball joint arranged between the two joints, the ball joint including:
    a ball connected to one of the shaft joints,
    a receptacle connected to the other shaft joint, wherein the ball is rotatably disposed in the receptacle and is axially slidable relative to the shaft end to which the receptacle is connected,
    a bushing disposed between the ball and the receptacle, and
    an elastic element disposed radially between the, receptacle and bushing, the elastic element allowing the ball to be elastically moveable in the receptacle in a direction lateral to the shaft end to which the ball is connected, wherein the elastic element is made from an elastomer having a Shore hardness in the range from 30 to 80.

19. The joint according to claim 18, wherein the bushing comprises a sintered metal having a supporting sleeve.

20. The joint according to claim 18, wherein the bushing is slotted such that the bushing can expand and contract radially and can be fitted onto the ball with pretension.

21. The joint according to claim 18, wherein the bushing surrounds the ball with zero play to compensate for wear and tolerances.

22. The joint according to claim 18, wherein the Shore hardness is in the range from 30 to 60.

23. The joint according to claim 18, wherein the bushing comprises a sliding coating.

* * * * *